3,474,050
POLYMER FOAMS REINFORCED WITH POLY-
AMIDE, POLYESTER AND POLYCARBONATE
FIBERS FORMED DURING THE FOAMING
PROCESS
David C. Chappelear, Thomas J. Stolki, Seymour Newman, and Quirino A. Trementozzi, Springfield, Mass., assignors to Monsanto Company, St. Louis, Mo., a corporation of Delaware
No Drawing. Filed Jan. 3, 1966, Ser. No. 517,957
Int. Cl. C08g *39/10, 49/04;* C08f *33/08*
U.S. Cl. 260—2.5                                         12 Claims

ABSTRACT OF THE DISCLOSURE

This invention relates to a process for preparing a thermoplastic resin foam which is reinforced with reticulate fibers selected from the group consisting of polyamide, polyester and polycarbonate fibers wherein the fibers are formed in situ in the barrel of a foaming extruder during the foaming operation. The fiber forming resin is melted in the barrel of the extruder and then drawn into fibers by the shearing action of the extruder. Selective absorption of pneumatogen (foaming agent) by the thermoplastic resin allows this component to form around the fibrous component.

---

This invention relates to novel foamed thermoplastic resins. More particularly it relates to novel foamed thermoplastic resins which are reinforced with a second component which is fibrous.

During recent years the foaming of thermoplastic resins has grown in commercial importance. Foamed thermoplastic resins find wide and practical use in such varied applications as thermal and acoustical insulation, shockproof shipping containers, ice buckets, beverage coolers, cups, toys, hospital pads, boating equipment, padded dashboards, visors in vehicles, cores for sandwich structures, etc.

In spite of their large growth and wide acceptance, foamed thermoplastic resins still have major shortcomings, such as poor tensile and tear strength which seriously limits their use.

An object of this invention is to provide foamed thermoplastic resins with greater tear and tensile strength.

Another object of this invention is to provide a method for producing foamed thermoplastic resins with greater care and tensile strength.

These and other objects are attained by producing a foamed thermoplastic resin reinforced with fibers, wherein the fibrous component is selected from the group consisting of polyesters, polyamides and polycarbonates; wherein the fibrous phase has a substantially greater toughness than the foamed phase.

The following examples are given in illustration of the invention and are not intended as limitations thereof. All parts and percentages are by weight unless otherwise specified.

Example I

This example deals with unreinforced polystyrene foam and is set forth as a control to illustrate the better physical properties that are achieved with the reinforced foams of this invention.

The following charge is placed in a covered, jacketed ribbon blender:

|  | Parts |
| --- | --- |
| 20 mesh granular styrene with a Staudinger molecular weight of about 55,000 | 100 |
| Colloidal silica | 3 |

The atmospheric oxygen is purged from the blender with nitrogen to a level of less than 6% oxygen. The styrene-silica mixture is then sprayed with 10 parts of a 95:5 pentane/acetone solution and blended for 30 minutes.

The above mixture is fed into a 2½ inch extruder which is maintained at the following conditions:

|  | Degrees, F. |
| --- | --- |
| Hopper | 80 |
| Feed zone | 80–90 |
| Middle zone | 250 |
| Die zone | 300 |
| Sheet die | 300 | with a 22 $L/D$ screw speed at 36 r.p.m. Foam is extruded through a sheet die at a rate of 100 lbs./hr. and a stock temperature of 290° F. The foam obtained has a thickness of about 0.1 inch and a density of from 2 to 4 lbs./cu. ft.

Example II

This example illustrates the use of a fibrous phase with a lower melting point than the processing temperature of the foamed phase, which becomes molten in the barrel of the extruder and is drawn into fine molten strands and dispersed throughout the foam. Upon cooling the molten polymer forms a reticulate fibrous network.

90 parts of less than 20 mesh granular styrene having a molecular weight of about 55,000 is blended with 10 parts of a polyamide resin of the nylon type having a melting point of about 300° F. and three parts of colloidal silica in a covered, jacketed ribbon blender for 30 minutes and then foamed according to the procedure of Example I.

The nylon melts at about 300° F. in the extrusion apparatus and while in this molten state it is drawn into fibers, stretched and dispersed throughout the foam phase and forms a reticulate reinforcing element upon cooling. Fiber orientation results on extrusion and expansion of the foam. The result is a reinforced foam having a thickness of about 0.1 inch and a density of from 2 to 4 lbs./cu. ft., which is found to be significantly stronger than the unreinforced foam of Example I, when tested by manually tearing and pulling the respective samples.

Example III

This example is included to illustrate the nature of the reinforcing fibers in the foamed phase and to show a novel method for producing staple fibers.

A continuous nylon mat is extracted from the reinforced foam prepared in Example II by soaking the foam in methyl ethyl ketone for several days. This mat, which is characterized by a reticulate network of fibers and insolubility in water and hydrocarbons, is placed in water and torn apart by a high shear Virtis stirrer (model 45, type Super 30 with a 45,000 r.p.m. maximum) to produce a suspension of fine fibers. These fibers are deposited on a wire screen to form a paper-like mat which shows evidence of interfiber bonding.

Example IV

This example is also set forth as a control to illustrate the poorer tensile strength of polyethylene foams that contain no reinforcing fibers.

100 parts of a granular high density polyethylene with a density of 0.96 and a melting range of 260°–270° F. (127°–132° C.) is fed into an extruder wherein a trichlorofluoromethane foaming agent is directly injected into the molten polyethylene according to the process outlined in U.S. Patent 3,160,688 under the following conditions:

| Zone | Degrees, F. |
| --- | --- |
| 1 | 302 |
| 2 | 302 |
| 3 | 266 |
| 4 | 248 |

The resulting unreinforced foam, which has a thickness of about 0.1 inch and a density of from 2 to 4 lbs./cu. ft., is then compared to the reinforced foam of the next example.

The following Examples V–VI illustrate the superior physical properties that are achieved when using reinforced forms.

Example V 80 parts of a granular high density polyethylene with a density of 0.96 and a melting range of 127–132° C. are dry blended with 20 parts of polypentamethylene terephthalate having a melting range of about 274° F. (134° C.). The dry blend is fed into an extruder wherein the polyethylene phase is foamed according to the extrusion process outlined in U.S. Patent 3,160,688 under the following conditions:

| Zone | Degrees, F. |
|---|---|
| 1 | 302 |
| 2 | 302 |
| 3 | 266 |
| Die | 248 | which is sufficient to melt the polyester. The fibrous phase is formed as outlined in Example II. In this example the trichlorofluoromethane foaming agent is directly injected into the molten polyethylene in the barrel of the extruder.

The resulting polyethylene foam which has a thickness of about 0.1 inch and a density of from 2 to 4 lbs./cu. ft., is reinforced by a reticulate network of polypentamethylene terephthalate fibers and has a greater tear and tensile strength than the unreinforced foam of Example IV. When the foams of Examples IV and V are tested by tearing and pulling, the reinforced foam of Example V is found to be much stronger.

Example VI 80 parts of a granular crystalline polypropylene with a melting point of about 348° F. (176° C.) are dry blended with 20 parts of a granular polycarbonate resin, which is the reaction product of an equimolar amount of 4,4'-dihydroxyphenyl ether and bisphenol A with a melting range of about 205–215° C. (400–420° F.). This blend is foamed according to the procedure set forth in Example V at the following temperatures:

| Zone | Degrees, F. |
|---|---|
| 1 | 356 |
| 2 | 392 |
| 3 | 428 |
| Die | 356 |

The polycarbonate melts in the barrel of the extruder, is drawn into fine strands and dispersed throughout the polypropylene. These fibers solidify and are oriented to a high degree upon blow extrusion and foaming to form a reticulate fibrous network upon cooling.

The resulting polypropylene foam, which has a thickness of about 0.1 inch and a density of from 2 to 4 lbs./cu. ft., is reinforced by reticulate network of polycarbonate fibers and is found to have a greater tear and tensile strength than the unreinforced foam of Example IV when tested manually by tearing and pulling.

Example VII

This example is included to illustrate that the reinforcing effect of the fibrous phase of this invention is applicable to foams prepared from copolymers as well as to those prepared from homopolymers. Ninety parts of a polystyrene/acrylonitrile copolymer which contains 90% by weight of styrene is dry blended with 10 parts of the polyamide of Example II and then foamed according to the procedure of Example I.

The resulting reinforced foam which has a thickness of about 0.1 inch and a density of from 2 to 4 lbs./cu. ft., has excellent tear and tensile strength which surpasses that of the unreinforced foam of Example I.

In general any foamable thermoplastic resin may be reinforced in accordance with the teaching of this invention.

Examples of foamable thermoplastic resins which may be employed in the practice of this invention include polymers of the lower alpha olefins of from 2 to 8 carbons, e.g., polyethylene, polypropylene, polybutene-1, polypentene-1 and their halogen and aliphatic substituted derivatives as represented by polyvinyl chloride, poly-4-methyl pentene-1, polyvinylidene chloride, etc.; polymers prepared from alkenyl aromatic monomers of the general formula:

$$H_2C=C-R_2$$
$$|$$
$$R_1$$

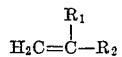

wherein $R_1$ is hydrogen, chlorine or methyl and $R_2$ is an aromatic radical of 6 to 10 carbon atoms which may also contain substituents such as halogens and alkyl groups attached to the aromatic nucleus, e.g., poly(styrene), poly(alpha-methylstyrene), poly(vinyl toluene), poly(alpha - chlorostyrene), poly(ortho - chlorostyrene), poly(parachlorostyrene), poly(meta - chlorostyrene), poly(ortho-methyl styrene), poly(para-methylstyrene), poly(ethylstyrene), poly(isopropyl styrene), poly(dichlorostyrene), poly(vinylnaphthalene), etc.

One might also use copolymers of the foregoing alkenyl aromatic monomers and a polymer which is the polymerization product of monomers of the general formula:

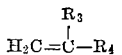

wherein $R_3$ is hydrogen or methyl and $R_4$ is nitrile, carboxyl (—COOH) or the methyl and ethyl esters thereof (—COOCH$_3$ and —COOC$_2$H$_5$ respectively). Examples of these types of copolymers would include styrene/acrylonitrile, styrene/methylmethacrylate, methylmethacrylate/acrylonitrile/styrene terpolymers, alpha-methyl styrene/methylmethacrylate, styrene/ethyl acrylate, etc.

Equally useful in the practice of this invention would be polymers and copolymers which contain a synthetic or natural rubber component such as butadiene, neoprene, nitrile rubbers, polyisoprene, polyisobutylene, natural rubbers, e.g., acrylonitrile/butadiene/styrene terpolymers, etc. These would include polyblends, graft copolymers, and physical admixtures of a rubbery component with a rigid or semi-rigid component as well as the direct copolymerization of the rubbery monomer with the other monomers. These copolymer compositions are well known to those skilled in the polymer art and need no further explanation here.

Another group of foamable thermoplastic resins suitable for the practice of this invention would include polyvinyl esters prepared from monomers of the general formula:

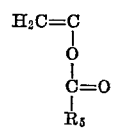

wherein $R_5$ is selected from the group comprising hydrogen, alkyl groups of from 1 to 10 carbon atoms, aryl groups of from 6 to 10 carbon atoms including the carbon atoms in ring substituted alkyl substituents; e.g., poly(vinyl formate), poly(vinyl acetate), poly(vinyl propionate), poly(vinyl benzoate) and the like.

Similar to the foregoing and equally useful are the vinyl ether type polymers prepared from monomers of the general formula:

wherein $R_6$ is an alkyl group of from 1 to 8 carbons, an aryl group of from 6 to 10 carbons, or a monovalent aliphatic radical of from 2 to 10 carbon atoms, which aliphatic radical may be hydrocarbon or oxygen containing, i.e., an aliphatic radical with ether linkages, and may also contain other substituents such as halogen, carbonyl, etc.

Examples of these polyvinyl ethers includes poly(vinylmethyl ether, poly(vinyl ethyl ether, poly(vinyl n-butyl ether), poly(vinyl 2-chloroethyl ether), poly(vinyl phenyl ether), poly(vinyl isobutyl ether), poly(vinyl cyclohexyl ether), poly(p-butylcyclohexyl ether), poly(vinyl ether of p-chlorophenyl glycol), etc.

Other thermoplastic resins which may be used in the practice of this invention include cellulose ethers, and esters, e.g., ethyl cellulose, cellulose acetate, cellulose acetatebutyrate; polyformaldehyde; polyacetals, etc. Especially preferred for the foamable resin are those resins excluding polyesters, polyamides and polycarbonates.

The practice of this invention contemplates the use of a foamable phase which is a copolymer, i.e., the polymeric product of two or more different monomers, as well as the use of a homopolymer foamable phase. As stated above, the concept intended here includes polyblends, graft copolymers and physical admixtures as well as copolymers prepared by the direct copolymerization of two or more monomers.

The fibrous phase must be selected so as to provide a second component which will reinforce and strengthen the foamed phase. The reinforcing effect can be explained by two mechanisms. When the fibrous phase is stronger and of higher modulus than the foamed phase, the fibrous phase will bear a significant portion of the load placed on the fiber reinforced foam thereby increasing the strength of the foam. Secondly, the tear strength of the foam is improved by virtue of the redistribution of the stress and the stopping of a tear when its tip encounters a transverse fiber. Likewise, the stress concentration at the tip of a microscopic crack which is capable of propagating through the foam becomes substantially dissipated when it encounters a fiber which redistributes the stress and stops further propagation of the crack.

In general, for either mechanism to operate effectively, the fibrous phase must have a greater toughness than the foamed phase, i.e., the fibrous phase must absorb a greater amount of energy prior to failure than an equal volume of the foamed phase.

The organic fibers are molecularly oriented by expansion during foaming or extrusion. Higher molecular orientation of the fibrous phase can be achieved by monoaxially or biaxially drawing the foam.

To achieve this reinforcing effect the fibers should have a length/diameter ratio ($L/D$) of at least 20 and up to 10,000 to obtain adequate adhesion to the foamed phase. In addition the fibers preferably form a reticulate network throughout the foamed phase. These fibers may comprise up to 40% by weight of the reinforced foam.

The reticulate nature of the fibers results when the fibrous phase is melted, drawn into fibers, stretched by the flow in the extruder, dispersed throughout the foam in an interconnecting network which forms a reinforcing element upon cooling.

The adhesion of the polyamide, polyester and polycarbonate fibers to the foamed matrix may be improved by grafting short polymer chains onto the fibers. The grafted chain preferably has a composition similar to that of the foamed phase used.

In order to produce the particulate fibrous structure and to obtain a reticulate network of fibers, throughout the foam the material passing into the die should be heated to above the midpoint of the melting range of the fibrous phase and preferably to at least 5° F. above the maximum of the melting range of the fibrous phase. This temperature will vary according to the particular material chosen for the fibrous phase.

In addition to the above, the foamable phase should exhibit a preferential absorption of the pneumatogen or foaming agent, whereas the fibrous phase should absorb little or no pneumatogen. This preferential absorption can be controlled in a manner known to those skilled in the art by selecting a pneumatogen or foaming agent which is a better solvent for the foamable phase than for the fibrous phase by balancing the polar nature of the pneumatogen and foamable phase. This preferential absorption may also be brought about in part by the fact that diffusion of the pneumatogen into the preformed fibrous phase is considerably slower than the diffusion into the foamable phase.

Alternately, foaming of the fibrous phase may be suppressed by eliminating nucleating agents from the fibrous phase and including them only in the foamable phase, by such means as blending the foamable phase with a nucleating agent and then extruding and pelletizing the mixture etc.

In general, polyamides, polyesters and polycarbonates and mixtures thereof are the preferred materials for use in the fibrous phase. Examples of polyamide type polymers useful in the practice of this invention would include nylon 6; nylon 66; nylon 4,10; etc. A more comprehensive list of suitable polyamides along with their softening points and method of preparation may be found in Kirk-Othmer, Encyclopedia of Chemical Technology, vol. 10, Interscience Encyclopedia, Inc., New York, 1953, pages 918–921. The term polyamide is also used to include the reaction products of dibasic acids and alcohol amines. These compounds, which are well known to those skilled in the art, are sometimes referred to as hybrids or polyester-amides. Examples of polyesters useful as the fibrous phase of this invention would include polyethylene terephthalate, polyethylene adipate, polyethylene sebacate; the reaction products of ethylene glycol and such acids as diphenoxyethane 4,4'-dicarboxylic acid; benzophenol 4,4'-dicarboxylic acid; 1,5 napthalene dicarboxylic acid; 2,6 naphalene dicarboxylic acid; 2,7 napthalene dicarboxylic acid; acids of the formula

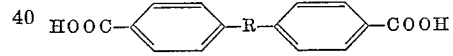

and

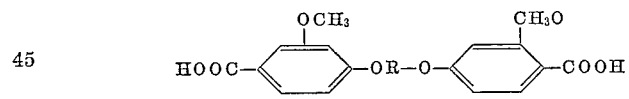

where R is

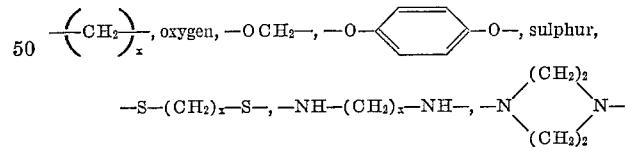

Other suitable polyesters would include the reaction products of aromatic dicarboxylic acids and bis(beta-oxyethyl) derivatives of diphenols, transquinitol and acetylated diphenols. One might also use polyesters which are the reaction products of hydroquinone diesters and terephthalic acid. Suitable polycarbonates to be used as reinforcing fibers would include 2,2-bis-(4-hydroxyphenylpropane polycarbonate and other polyarylcarbonates that can be extruded to form composite monofilaments with a foamable thermoplastic resin. Examples of suitable polycarbonates would include the equimolar reaction products of 4,4' - dihydroxyphenyl ether/bisphenol - A; 4,4'-dihydroxyphenyl ether/4,4' dihydroxyphenyl sulfone; 4,4'-dihydroxyphenyl ether/4,4' dihydroxyphenyl ketone; and 3/1 molar reaction product of 4,4''-dihydroxyphenyl ether/hydroquinone and the 1/3 molar reaction product of p,p'-dihydroxytriphenyl ether/bisphenol-A.

Examples of aromatic-aliphatic polycarbonates would include the equimolar reaction products of bisphenol-A with such co-reactants as ethylene glycol, hydrogenated bisphenol-A, p-xylylene glycol, and 1,6 hexane diol.

Other materials classed as polyester-polycarbonates may also be used as the fibrous phase. Examples of these would include the coreaction products of bisphenol-A with such acids as adipic, azelaic, isophthalic, terephthalic, 3,6 - endomethylene - 4 - tetrahydrophthalic, p′-hydroxybenzoic, etc.

The foaming of the thermoplastic polymer may be accomplished by any of the conventional methods which are currently used to prepare low density foamed thermoplastic resins in which the polymer flows before foaming. These include such diverse methods as extruding thermoplastic beads or pellets which contain pneumatogens, e.g., Platzer U.S. Patent 3,072,581; extrusion of thermoplastic wherein the pneumatogen is injected directly into the extrusion barrel such as is taught in Aykanian et al. U.S. Patent 3,160,688; and extrusion of thermoplastic resins containing a chemical blowing agent which decomposes at extrusion temperatures to foam the resin.

These and other methods should be familiar to those skilled in the art of preparing foamed thermoplastic resins and need not be described further here.

Also contemplated within the scope of this invention is the use of such materials as pigments, dyes, stabilizers, nucleating agents, fillers, plasticizers, etc.

It is apparent that many variations may be made in the products and processes of this invention without departing from the spirit and scope thereof.

What is claimed is:

1. A foamed thermoplastic resin reinforced with a reticulate fibrous network, wherein the fibrous component is selected from the group consisting of polyester, polyamide and polycarbonate fibers which are substantially tougher and stronger than the foamed phase with the proviso that polyesters, polyamides and polycarbonates are not used as the foamed phase; wherein the reinforced resin is produced by a process comprising:
   (1) blending a foamable thermoplastic resin with a fiber-forming resin selected from the group consisting of polyamide, polyester and polycarbonate resins,
   (2) heating the foamable resin/fiber forming resin blend in the barrel of an extruder to a temperature, which is at least 5° F. above the maximum of the melting range of the fiber-forming resin to melt to fiber-forming resin,
   (3) subjecting the molten fiber-forming resin to shearing action in the barrel of the extruder to draw the resin into fibers,
   (4) foaming the thermoplastic resin around the fibers formed in step (3) above, and
   (5) cooling the fiber reinforced foam.

2. A composition as in claim 1 wherein the foamed phase is an alkyl aromatic polymer.

3. A composition as in claim 2 wherein the foamed phase is polystyrene and the fibrous phase is a polyamide.

4. A composition as in claim 1 wherein the foamed phase is a polymer of a lower alpha-olefin containing of from 2 to 8 carbon atoms.

5. A composition as in claim 4 wherein the foamed phase is polyethylene and the fibrous phase is a polyester.

6. A composition as in claim 4 wherein the foamed phase is polypropylene and the fibrous phase is a polycarbonate.

7. A process for the production of a foamed thermoplastic resin reinforced with fibers, wherein the fibrous component is selected from the group consisting of polyamide, polyester and polycarbonate fibers wherein the fibrous phase is substantially tougher and stronger than the foamed phase with the proviso that polyesters, polyamides and polycarbonates are not used as the foam phase; the process comprising:
   (1) blending a foamable thermoplastic resin with a fiber forming resin selected from the group consisting of polyamide, polyester and polycarbonate resins,
   (2) heating foamable resin/fiber forming resin blend in the barrel of an extruder to a temperature, which is at least 5° F. above the maximum of the melting range of the fiber forming resin to melt the fiber forming resin,
   (3) subjecting the molten fiber forming resin to shearing action in the barrel of the extruder to draw the resin into fibers,
   (4) foaming the thermoplastic resin around the fibers formed in step (3) above, and
   (5) cooling the fiber reinforced foam.

8. A process as in claim 7 wherein the foamed phase is an alkyl aromatic polymer.

9. A process as in claim 8 wherein the foamed phase is polystyrene and the fibrous phase is a polyamide.

10. A process as in claim 7 wherein the foamed phase is a polymer of a lower alpha-olefin containing of from 2 to 8 carbon atoms.

11. A process as in claim 10 wherein the foamed phase is polyethylene and the fibrous phase is a polyester.

12. A process as in claim 10 wherein the foamed phase is polypropylene and the fibrous phase is a polycarbonate.

References Cited

UNITED STATES PATENTS

| | | |
|---|---|---|
| 2,805,208 | 9/1957 | Roche. |
| 2,880,057 | 1/1958 | Cuculo. |
| 3,062,682 | 11/1962 | Morgan et al. |
| 3,345,442 | 10/1967 | Oxel _____ 260—2.5 |

MURRAY TILLMAN, Primary Examiner

MORTON FOELAK, Assistant Examiner

U.S. Cl. X.R.

161—169; 260—41, 41.5, 857, 3, 873 874, 16, 13; 264—47, 53, 75, 174